Patented May 14, 1935

2,001,523

UNITED STATES PATENT OFFICE 2,001,523

HYDROXY DIPHENYL INTERMEDIATES

Walter G. Christiansen, Glen Ridge, N. J., and Sidney E. Harris, Lynbrook, N. Y., assignors to E. R. Squibb & Sons, New York, N. Y., a corporation of New York No Drawing. Application June 3, 1933, Serial No. 674,212

1 Claim. (Cl. 260—143)

This invention relates to, and has for its object the provision of, certain new compounds, useful as intermediates in the preparation of bactericides.

Compounds of this invention have the general formula 2-hydroxy 4'-X diphenyl wherein X represents either a nitro group or an amino group.

EXAMPLES 2-hydroxy 4'-nitro diphenyl

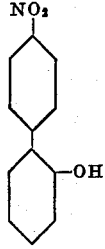

140 cc. concentrated sulfuric acid is added to 1400 g. water; 174 g. 2-amino 4'-nitro diphenyl is added to the hot mixture; the solution is heated with vigorous agitation to 90–95°, and, while the temperature is maintained at 95°, a solution of 56.1 g. sodium nitrite in 1 liter water is added in a slow stream during about half an hour; stirring and heating at 95° are continued for an additional half hour; evolution of nitrogen having ceased, the reaction mixture is cooled, and the acid liquor is decanted from a heavy tarry reaction product, which is then boiled with 1.5 liters 4% sodium hydroxide; filtration and acidification with dilute sulfuric acid yields the desired compound, which on recrystallization from diluted alcohol forms faintly yellow needles melting at 123–124°.

2-hydroxy 4'-amino diphenyl

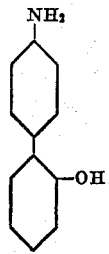

100 g. 2-hydroxy 4'-nitro diphenyl is dissolved in a mixture of 2 liters water and 750 cc. 10% sodium hydroxide; the mixture is heated to about 90° and a slight excess of sodium hydrosulfite is added in small portions with stirring; the desired compound forms a grayish precipitate, which is filtered off, cooled, and thoroughly washed with water, and, on recrystallization from alcohol and water, melts at 167°.

We claim:

2-hydroxy 4'-nitro diphenyl.

WALTER G. CHRISTIANSEN.
SIDNEY E. HARRIS.